US012487066B2

(12) United States Patent
Barkley et al.

(10) Patent No.: US 12,487,066 B2
(45) Date of Patent: Dec. 2, 2025

(54) MICROWAVE-INITIATED ANTENNA IGNITERS WITH BANDWIDTH SELECTIVITY

(71) Applicant: The United States of America, as Represented by the Secretary of the Navy, Crane, IN (US)

(72) Inventors: Stuart Barkley, Bloomington, IN (US); Travis Sippel, Ames, IA (US); Justin Lajoie, Ankeny, IA (US)

( * ) Notice: Subject to any disclaimer, the term of this patent is extended or adjusted under 35 U.S.C. 154(b) by 0 days.

(21) Appl. No.: 18/756,549

(22) Filed: Jun. 27, 2024

(65) Prior Publication Data

US 2025/0035418 A1 Jan. 30, 2025

Related U.S. Application Data

(60) Provisional application No. 63/523,670, filed on Jun. 28, 2023.

(51) Int. Cl.

*F42B 3/12* (2006.01)
*F42C 13/04* (2006.01)
*H01Q 9/06* (2006.01)

(52) U.S. Cl.

CPC ................ *F42C 13/04* (2013.01); *F42B 3/12* (2013.01); *F42B 3/128* (2013.01); *H01Q 9/065* (2013.01)

(58) Field of Classification Search

CPC .. F42C 13/04; F42B 3/128; F42B 3/12; F42B 3/121; F42B 3/124; F42B 3/125; F42B 3/127; F42B 3/13; H01Q 9/065
USPC .......................................................... 102/206
See application file for complete search history.

(56) References Cited

U.S. PATENT DOCUMENTS 7,987,760 B1 * 8/2011 Lundquist ............... F41H 11/12
89/1.13

* cited by examiner

*Primary Examiner* — John Cooper
(74) *Attorney, Agent, or Firm* — Naval Surface Warfare Center, Crane Division; Christopher Feigenbutz

(57) ABSTRACT

Disclosed is a tunable microwave-initiated antenna igniter. The device includes a pair of tunable microstrip antennas on a substrate configured to receive an electromagnetic radiation frequency that provides ignition energy; and a conductive material spanning a dielectric gap between the pair of tunable microstrip antennas. The conductive material spanning the dielectric gap can include a dielectric epoxy or a bridgewire. The microstrip antennas are tunable for frequency and bandwidth by varying dipole length and/or width. Tuning causes the microstrip antennas to reject accidental ignition from an off frequency high power microwave field. The tunability, bandwidth selectivity, and low energy requirements allow for use of the tunable microwave-initiated antenna igniters in a number of new and challenging ignition applications.

36 Claims, 13 Drawing Sheets

MICROWAVE-INITIATED ANTENNA IGNITERS WITH BANDWIDTH SELECTIVITY

CROSS-REFERENCE TO RELATED APPLICATIONS

The present application claims priority to U.S. Provisional Patent Application Ser. No. 63/523,670, filed Jun. 28, 2023 entitled "MICROWAVE-INITIATED ANTENNA IGNITERS WITH BANDWIDTH SELECTIVITY," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211595US02) is assigned to the United States Government and is available for licensing for commercial purposes. Licensing and technical inquiries may be directed to the Technology Transfer Office, Naval Surface Warfare Center Crane, email: Crane_T2@navy.mil.

FIELD OF THE INVENTION

The field of invention relates generally to igniters. More particularly, it pertains to a microwave-initiated antenna igniters with bandwidth selectivity.

BACKGROUND

The ignition of an energetic material is a demanding application, requiring repeatable and precise timing and delivery of a prescribed energy release over a specific period of time. The precision and repeatability of igniter characteristics, while also achieving short time delay, is of critical need. In a common form, igniters are composed of a pyrotechnic charge connected electrically to an ignition energy source such as a constant voltage source or a capacitor. Ignition system design frequently requires consideration of obstructions (e.g. pressure vessels), the span of long distances with ignition wires, and consideration of accidental ignition (i.e. sensitivity of igniter composition to ESD, impact, friction, and/or other stimuli). Of particular concern is inductance-induced propagation velocity lag and long transmission distances. As such, long igniter leads pose a time delay uncertainty that must be characterized (e.g. in detonation), and are an element of failure that require physical protection, maintenance, and can be time consuming to set up and troubleshoot.

One technique to alleviate some drawbacks of conductive lead ignition systems is to transport ignition energy coherently through space via laser. Laser ignition for energetic materials has been used as an alternative to the methods discussed above. The energy interaction volumes (i.e. localized heating) are limited with laser ignition due to the absorptivity and scattering common at high-power laser wavelengths in many energetic materials; however, control of timing, energy fluence, and energy deposition duration are unparalleled. As an alternative to wires, laser ignition adds complexity to setups due to the optical access requirements for the laser to function. Also, the spectral properties of composite energetics (i.e. AP composite propellant) may result in uneven heating rates across different formulations and additives.

Photoflash ignition (i.e. broadband radiation) circumvents the aforementioned drawback of laser ignition through photon dispersion over a broad energy spectrum. In its most common form, this technique utilizes a high intensity optical flash to rapidly heat photothermal particles in the material. In utilization of this technique, an energetic material is often doped with a photo-ignition sensitive additive that ignites either through a photothermal or a surface plasmonic resonance mechanism. Typical additives are Pt, nanoscale silicon particles (nSi), single wall carbon nanotubes, multi-walled carbon nanotubes, two-dimensional carbon materials (graphene oxide), and three-dimensional carbon structures (carbon aerogels). The downside to ignition with this method is the required addition of aforementioned particles, their spectral property dependence on thermal/optical properties (e.g. size, morphology) to wavelength, loose powders/low density mixtures, and optical access to the energetic.

Another electromagnetic ignition technique involves the addition of a dopant sensitive to microwave field absorption, in which energetic materials are typically transparent. One prior art approach includes increasing to increase the local burning rate of AP propellant dramatically by embedding a wire on the orders of microwave wavelengths (cms in length) within a propellant grain, in which the dipole wire thermally heated with a microwave field causing the propellant nearby to ignite. Another approach to increase microwave ignition sensitivity of an energetic was the inclusion of high dielectric loss materials (nm to mm scale). Thermites coated with graphene oxide have been demonstrated as microwave reflectors but can be thermally reduced to form reduced graphene oxide and switched to microwave absorbers and ignite with a microwave field.

Microwave coupling gas generating thermites have also been demonstrated. When a microwave field is applied, microwave energy is deposited to the dopant that is mixed with a thermite, which causes the composition to microwave-heat to ignition temperature. Other prior art methods include utilizing ways to couple microwaves directly with energetics such as energetic inks created from printed nAl and $MnO_x$ and subsequently triggering ignition with microwave energy. However, the modification of an energetic material by composition only (i.e. doping alone), while proven effective at enabling both laser and microwave ignition, can offer only limited coupling efficiency and lacks tunability (frequency, bandwidth, etc.). The development of antenna ignition structures is an attractive alternative that may overcome these shortfalls. Spectral aspects of the antenna igniter (i.e. ignition center frequency, bandwidth, and loss magnitude) are all readily adjustable without the requirement to investigate microwave interaction with new materials.

There are many use cases for such microwave igniters, which non exhaustively include the development of simplified and higher density (i.e. lower void volume) gun propellant charges with microwave-assisted flame spread, and SRM self-destruct charges. As can be appreciated from the above, a tunable microwave-initiated antenna igniter is desirable.

SUMMARY OF THE INVENTION

Disclosed is a tunable microwave-initiated antenna igniter. The device includes a pair of tunable microstrip antennas on a substrate configured to receive an electromagnetic radiation frequency that provides ignition energy; and a conductive material spanning a dielectric gap between the pair of tunable microstrip antennas. The conductive material spanning the dielectric gap can include a dielectric epoxy or a bridgewire. The microstrip antennas are tunable for frequency and bandwidth by varying dipole length and/or width. Tuning causes the microstrip antennas to reject accidental ignition from an off frequency high power microwave field. The tunability, bandwidth selectivity, and low energy requirements allow for use of the tunable microwave-initiated antenna igniters in a number of new and challenging ignition applications.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying Figs in which.

DETAILED DESCRIPTION OF THE DRAWINGS

Figure 1:
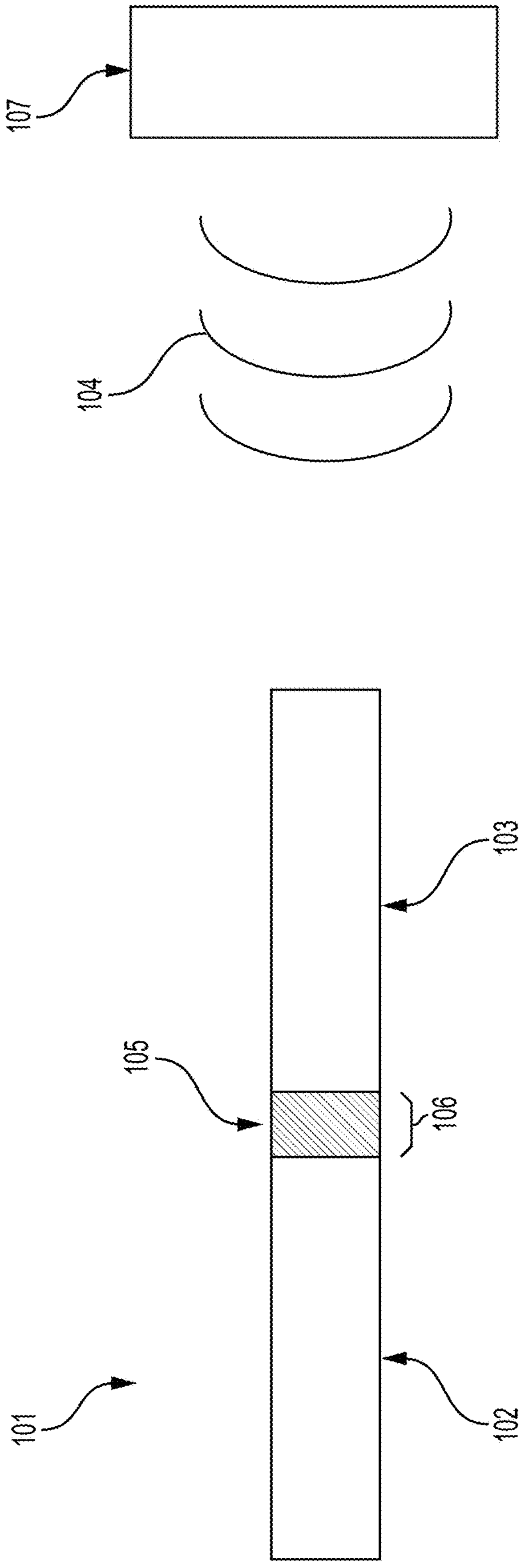
FIG. 1 shows a schematic of a tunable microwave-initiated antenna igniter.

The embodiments of the invention described herein are not intended to be exhaustive or to limit the invention to precise forms disclosed. Rather, the embodiments selected for description have been chosen to enable one skilled in the art to practice the invention.

Generally, provided is a tunable microwave-initiated antenna igniter comprising: a pair of tunable microstrip antennas configured to receive an electromagnetic radiation frequency that provides ignition energy; and a conductive material spanning a gap between the pair of tunable microstrip antennas.

In an illustrative embodiment, the pair of tunable microstrip antennas are disposed on a substrate. In an illustrative embodiment, the substrate is a printed circuit board. In an illustrative embodiment, the substrate is an FR4 printed circuit board. In an illustrative embodiment, the pair of tunable microstrip antennas comprises half wavelength aluminum microstrip dipole antennas In an illustrative embodiment, the half wavelength aluminum microstrip dipole antennas are rounded microstrip dipole antennas. In an illustrative embodiment, the half wavelength aluminum microstrip dipole antennas are rectangular microstrip dipole antennas In an illustrative embodiment, the pair of tunable microstrip antennas are tunable for frequency and bandwidth.

In an illustrative embodiment, the dipole resonant frequency of the pair of tunable microstrip antennas is tuned by varying dipole length. In an illustrative embodiment, the dipole resonant frequency and bandwidth of the pair of tunable microstrip antennas is tuned by varying dipole width. In an illustrative embodiment, the pair of tunable microstrip antennas are tunable to reject off-frequency high-power fields that may produce accidental ignitions. In an illustrative embodiment, the gap is a dielectric gap.

In an illustrative embodiment, the conductive material spanning the gap is a bead of thermite epoxy. In an illustrative embodiment, the thermite epoxy comprises dielectric epoxy and nanothermite. In an illustrative embodiment, the thermite epoxy comprises 70 wt. % to 90 wt. % dielectric epoxy and 10 wt. % to 30 wt. % nanothermite.

In an illustrative embodiment, the conductive material spanning the gap is a bridgewire. In an illustrative embodiment, the bridgewire is selected from the group consisting of 304 stainless steel, copper, molybdenum, nickel chromium 60, tantalum, and tungsten. In an illustrative embodiment, the bridgewire spans the gap by soldering In an illustrative embodiment, the bridgewire is copper plated prior to soldering. In an illustrative embodiment, the bridgewire spans the gap by joining using conductive epoxy. In an illustrative embodiment, the bridgewire spanning the gap is graphite.

In an illustrative embodiment, provided is a tunable microwave-initiated antenna igniter comprising: a pair of tunable microstrip antennas disposed on a substrate and configured to receive an electromagnetic radiation frequency that provides ignition energy; and a conductive material spanning a dielectric gap between the pair of tunable microstrip antennas; wherein tuning a dipole length and/or width of the tunable microstrip antennas tunes a dipole resonant frequency and/or bandwidth to reject off-frequency high-power fields to prevent accidental ignitions.

FIG. 1 shows a schematic of a tunable microwave-initiated antenna igniter 101. In an illustrative embodiment, the igniter 101 comprises a pair of tunable microstrip antennas 102, 103 configured to receive an electromagnetic radiation frequency 104 that provides ignition energy; and a conductive material 105 spanning a gap 106 between said pair of tunable microstrip antennas 102, 103. In an illustrative embodiment, the electromagnetic radiation frequency 104 is produced by a radio-frequency source 107. In an illustrative embodiment, the gap 106 is a dielectric gap.

In an illustrative embodiment, the first and a second tunable microstrip antennas 102, 103 comprise half wavelength aluminum microstrip dipole antennas. As can be appreciated, this antenna type provides an increased bandwidth when compared to straight dipole antenna geometries, thereby providing greater frequency selectivity. In some embodiments, half wavelength aluminum microstrip dipole antennas occupy an area smaller than a 15 mm×15 mm square (compared to dipoles antennas of dimensions ~60 mm by 10 mm), allowing for antenna miniaturization). In an illustrative embodiment, rectangular spiral antennas can be utilized where manufacturing complexity is not of concern and space constraints and high frequency selectivity are desired. In an illustrative embodiment, the antennas are tunable for frequency and bandwidth. In an illustrative embodiment, the half wavelength aluminum microstrip dipole antennas 102, 103 comprise a 10 mm width, a 59.22 mm length, a 35 μm thickness, a 1 mm gap, and a resonant frequency of 2.45 GHz.

Figure 2:
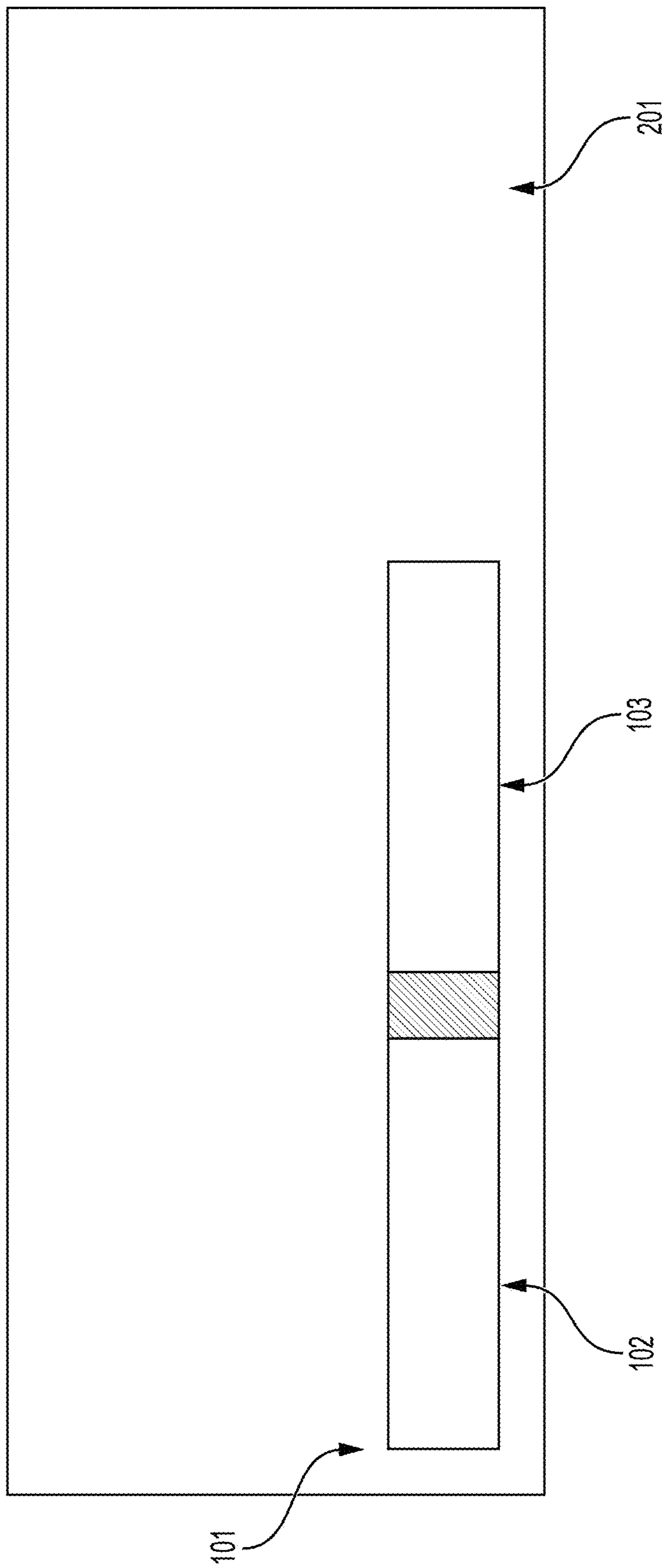
FIG. 2. shows an overhead view of a tunable microwave-initiated antenna igniter on a substrate.

FIG. 2. shows an overhead view of a tunable microwave-initiated antenna igniter 101 on a substrate 201. In an illustrative embodiment, the pair of tunable microstrip antennas 102, 103 are disposed on a substrate 201. In an illustrative embodiment, the substrate 201 is a printed circuit board (PCB). In an illustrative embodiment, the PCB is a conventional is a circuit board that utilizes a medium to connect components to one another in a circuit. In an illustrative embodiment, the PCB comprises an FR4 substrate. As can be appreciated, an FR4 PCB utilizes a base material constructed of a flame retardant epoxy resin and glass fabric composite. An FR4 PCB provides adhesion to copper foil and further provides minimal water absorption.

Figure 3:
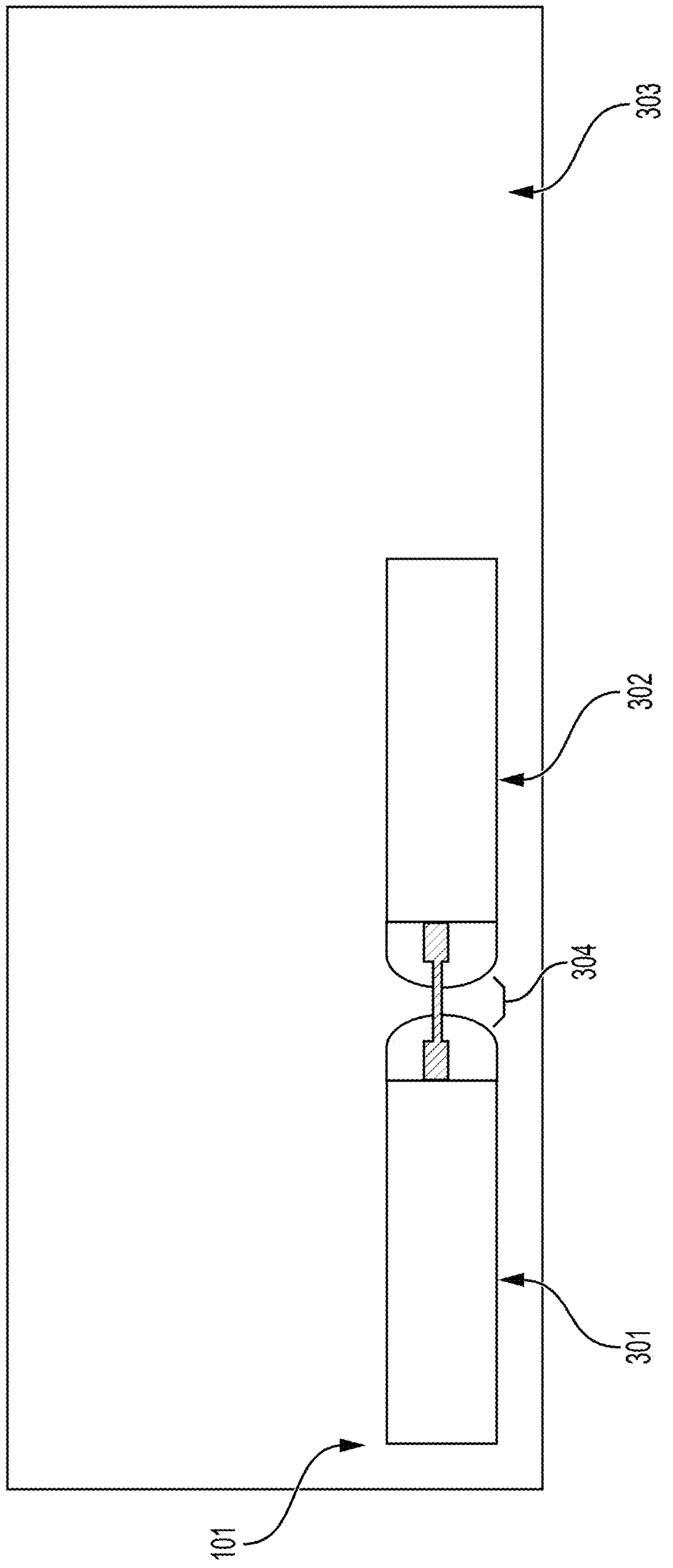
FIG. 3 shows an overhead view of rounded half wavelength aluminum microstrip dipole antennas on a substrate.

FIG. 3 shows an overhead view of rounded half wavelength aluminum microstrip dipole antennas 301, 302 on a substrate 303. In an illustrative embodiment, the antennas 301, 302 are half wavelength dipoles of aluminum that have rounded bridge microstrips. In an illustrative embodiment, the antennas are 10 mm width, 59.22 mm length, 0.035 mm thickness, with a 1 mm gap therebetween. In an illustrative embodiment, rounded half wavelength aluminum microstrip dipole antennas 301, 302 produce a sufficiently strong potential across the gap 304.

Figure 4:
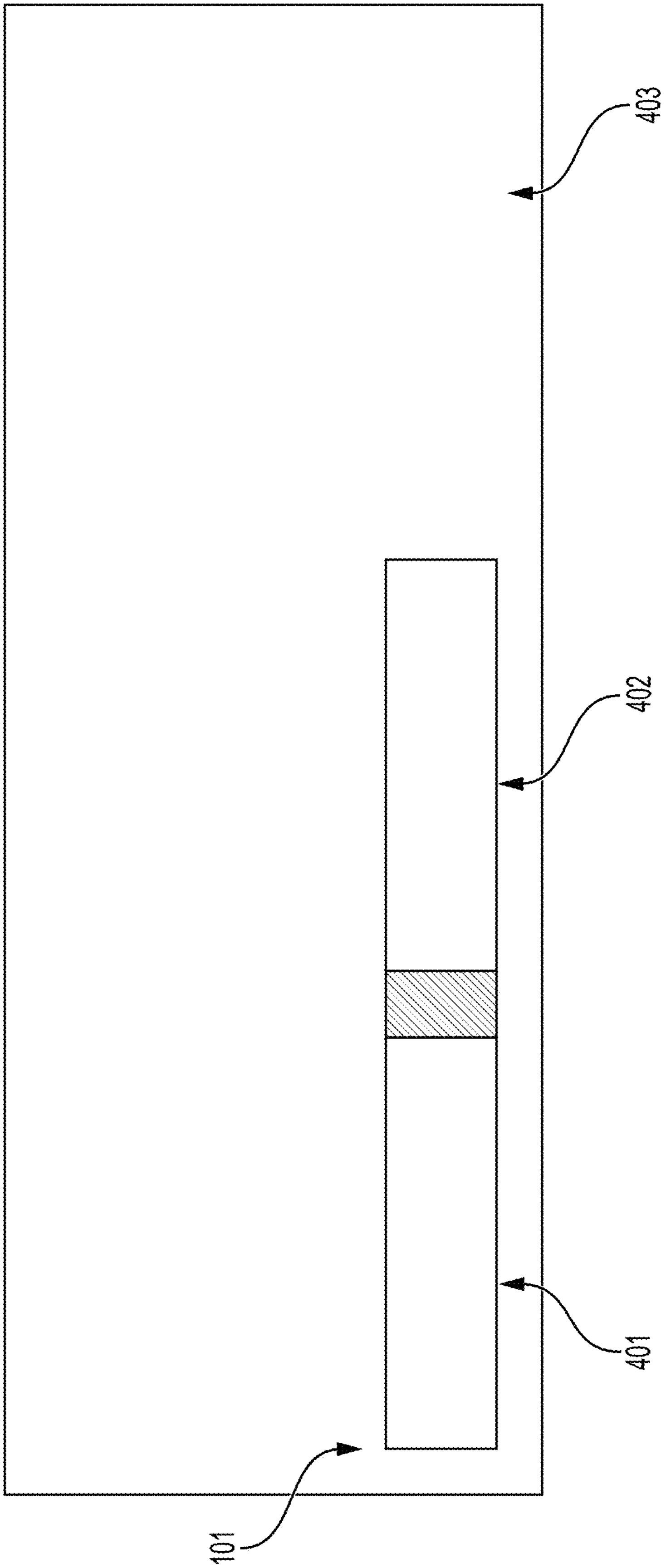
FIG. 4 shows an overhead view of rectangular half wavelength aluminum microstrip dipole antennas on a substrate.

FIG. 4 shows an overhead view of rectangular half wavelength aluminum microstrip dipole antennas 401, 402 on a substrate 403. In an illustrative embodiment, the antennas 401, 402 are half wavelength dipoles of aluminum that have rectangular bridge microstrips. In an illustrative embodiment, the choice of either rectangular 404 or rounded 304 dipole geometry has little effect on frequency response or loss amplitude, which will be shown in greater detail below.

In an illustrative embodiment, pair of tunable microstrip antennas are tunable for frequency and bandwidth. In an illustrative embodiment, dipole resonant frequency of the pair of tunable microstrip antennas is tuned by varying dipole length. In an illustrative embodiment, wherein dipole resonant frequency and bandwidth of the pair of tunable microstrip antennas is tuned by varying dipole width. In an illustrative embodiment, the pair of tunable microstrip antennas are tunable to reject off-frequency high-power fields that may produce accidental ignitions. Further discussion illustrating the tenability of the tunable microstrip antennas will be shown in greater detail below.

Figure 5:
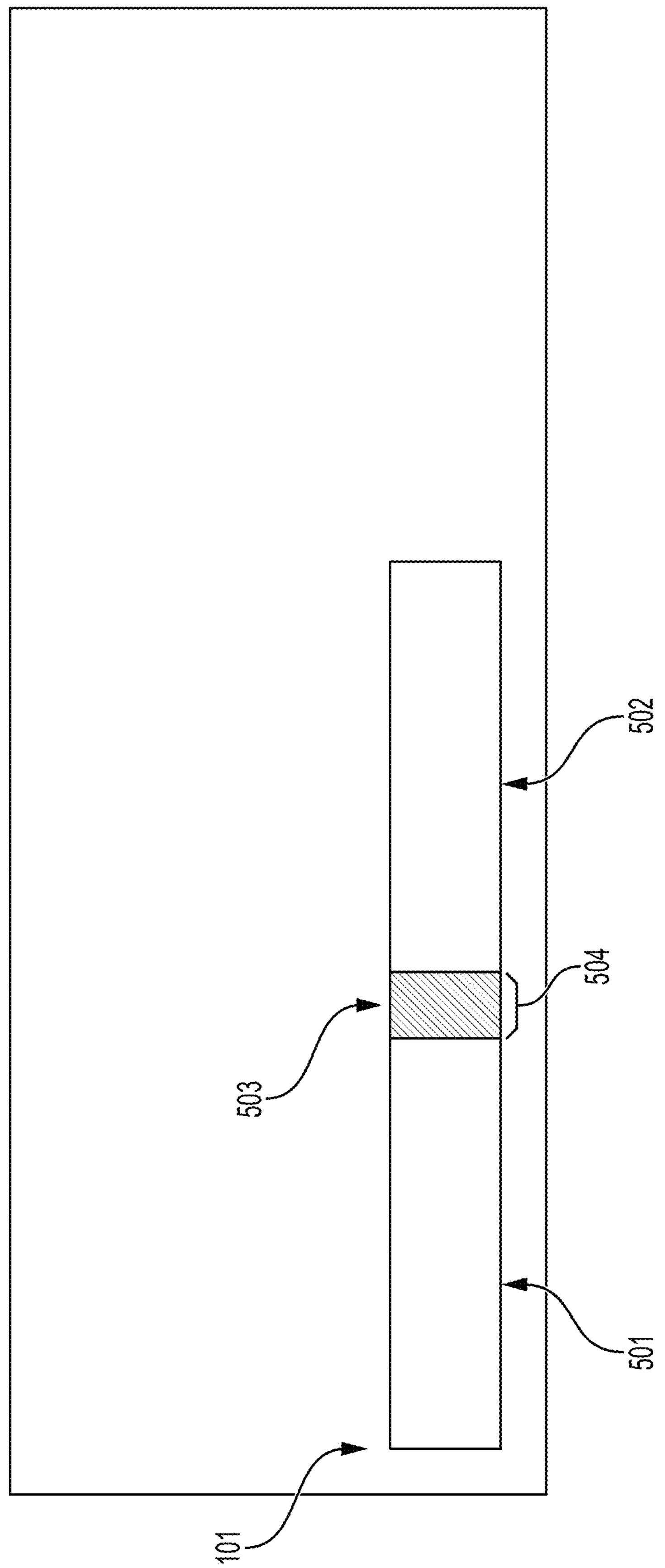
FIG. 5 shows a pair of tunable microstrip antennas with a bead of thermite epoxy spanning a dielectric gap.

FIG. 5 shows a pair of tunable microstrip antennas 501, 502 with a bead of thermite epoxy 503 spanning a dielectric gap 504. In an illustrative embodiment, the conductive material spanning the dielectric gap 504 is a bead of thermite epoxy 503. In an illustrative embodiment, the thermite epoxy 503 comprises dielectric epoxy and nanothermite. In an illustrative embodiment, the thermite epoxy 503 comprises 70 wt. % to 90 wt. % dielectric epoxy and 10 wt. % to 30 wt. % nanothermite. In an illustrative embodiment, the thermite epoxy 503 comprises a two-part dielectric epoxy (JB-Qwik Weld) mixed with an aluminum/bismuth trioxide nanoscale thermite, $Bi_2O_3$, (90-210 nm Sigma-Aldrich) and Al (80 nm, Novacentrix), at a stoichiometric ratio (11 wt. % Al/89 wt. % $Bi_2O_3$), with loadings of 10, 20, & 30 wt. % of thermite (balance epoxy). The dielectric epoxy and thermite were then well mixed. In an illustrative embodiment, a thin bead of thermite epoxy 503 (approximately 3.3 mm wide and 1 mm high) is placed at the dielectric gap 504 between the pair of tunable microstrip antennas 501, 502 to permit ignition when electromagnetic radiation frequency is produced by a radio-frequency source.

Figure 6:
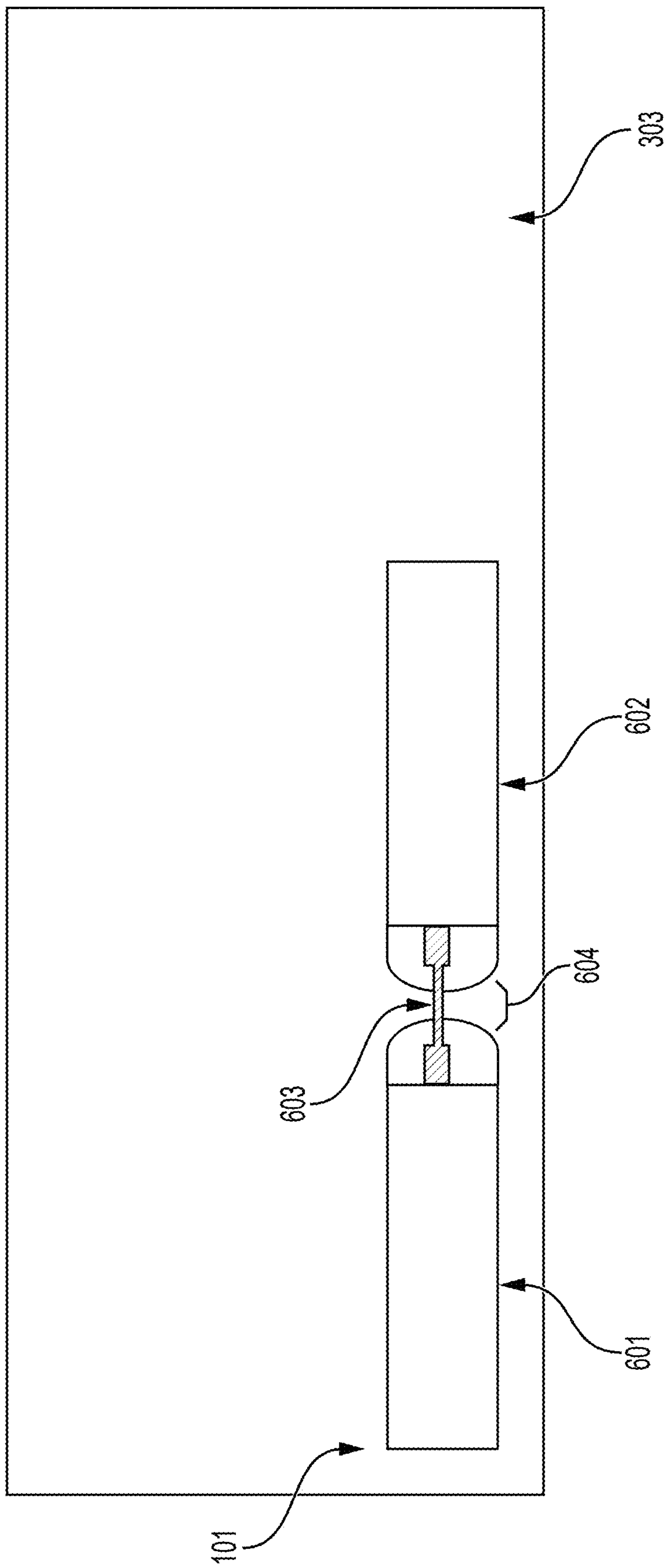
FIG. 6 shows a pair of tunable microstrip antennas with a conductive material spanning a dielectric gap.

FIG. 6 shows a pair of tunable microstrip antennas 601, 602 with a conductive material 603 spanning a dielectric gap 604. In an illustrative embodiment, the conductive material spanning 603 the dielectric gap 604 is a bridgewire. In an illustrative embodiment, a bridgewire is soldered across the dielectric gap 604 using leaded solder. In an illustrative embodiment, the bridgewire can be selected from Table 1. For molybdenum and tantalum wires as well as graphite rods, soldering was not achievable. For these materials, two alternative joining methods can be used: 1) copper plating prior to soldering, and 2) joining using conductive epoxy. For molybdenum wires, copper plating can be performed on the wire ends by submersion in a copper/acetic acid solution (copper-saturated vinegar) for 10 min, using the wire as anode and a sacrificial piece of copper as a cathode. In a separate process, bridgewire igniters of graphite, tantalum, and tungsten can be fabricated using conductive epoxy, (Loctite TIGA Silver 920H).

In an illustrative embodiment, Table 1 provides a non-limiting list of wire materials for use as bridgewire igniters and their relevant thermal and electrical properties. In an illustrative embodiment, materials include 304 stainless steel, copper, graphite, molybdenum, nickel chromium 60, tantalum, and tungsten. Properties include thermal conductivity, k; density, p; specific heat, Cv; metal melt temperature, Tm; oxide melt temperature, Tm,Oxide; metal volatilization temperature (1 atm), Tvol; oxide volatilization temperature (1 atm), Tvol,Ox; electrical conductivity, σ; skin thickness, δ; enthalpy of fusion, ΔHf; and volumetric melt enthalpy (sensible+latent), ΔEmelt.

TABLE 1

| Bridgewire Material | | | | | | | | | | | |
|---|---|---|---|---|---|---|---|---|---|---|---|
| Wire Mat | k (W/m/K) | ρ (kg/m³) | $C_v$ (J/kg/K) | $T_m$ (K) | $T_{m,Ox}$ (K) | $T_{vol}$ (K) | $T_{vol,Ox}$ (K) | $\sigma \cdot 10^6$ (S/m) | δ, 2.45 GHz (μm) | $\Delta H_f$ (kJ/kg) | $\Delta E_{melt}$ (J/mm³) |
| 304 SS | 16.2 | 8,000 | 490 | 1698 | 1838 (Fe) | 3135 (Fe) | 3687 (Fe) | 1.45 | 8.629 | 273 | 7.68 |
| Cu | 401 | 8,960 | 385 | 1358 | 1599 | 2835 | 2273 | 58.7 | 1.333 | 206 | 5.51 |
| C | 200 | 2,260 | 707 | — | — | 3400* | 0 | 0.003 | 550 | — | — |

TABLE 1-continued

| Bridgewire Material | | | | | | | | | | | |
|---|---|---|---|---|---|---|---|---|---|---|---|
| Wire Mat | k (W/m/K) | ρ (kg/m$^3$) | $C_v$ (J/kg/K) | $T_m$ (K) | $T_{m,Ox}$ (K) | $T_{vol}$ (K) | $T_{vol,Ox}$ (K) | $\sigma \cdot 10^6$ (S/m) | δ, 2.45 GHz (μm) | $\Delta H_f$ (kJ/kg) | $\Delta E_{melt}$ (J/mm$^3$) |
| (Gr) | | | | | | | | | | | |
| Mo | 142 | 10,200 | 250 | 2896 | 1068 | 4912 | 1428 | 20 | 2.466 | 375 | 10.46 |
| NiCr 60 | 11.3 | 8,250 | 450 | 1673 | 873 (Ni) | 3003 | — | 1 | 10.169 | 298 | 7.57 |
| Ta | 57.5 | 16,600 | 140 | 3293 | 2145 | 5730 | — | 7.7 | 3.681 | 199 | 10.27 |
| W | 164 | 19,000 | 134 | 3695 | 1473 | 6203 | 1700 | 18.94 | 2.33 | 190 | 12.27 |

*Graphite volatilization temperature

Experiment

Frequency Response Measurements

A VNA was utilized to measure S-parameters of the dipole antennas over a frequency range of 1 GHz to 20 GHz. Soldered SMA connectors and a SMA to N-Type adapter were used to interface a VNA one-port measurement with the dipole antenna. A calibrated, one-port measurement frequency sweep of 10,000 points, with 10-point averaging was performed for measurements at each frequency. Calibration was performed using Anritsu procedure for a N-type connection kit. Resulting frequency response curves were smoothed (5%) using the VNA acquisition software and prior to each use, the VNA was allowed to thermally stabilize for 30 min before a one-port calibration was performed.

The S11 parameter is a ratio of power reflected back to the power sent to the DUT (device under test). As such, a negative return loss value represents high absorption and high dipole energy loss (i.e. a resonant condition), which low reflection corresponds to absorption and/or radiation (high voltage potential) of a dipole in receiver mode operation.

Free Space Cavity

A free space microwave cavity was utilized to measure microwave ignition delays of both dielectric (thermite epoxy) breakdown and bridgewire igniter, in order to create an environment similar to operation conditions. Anechoic tiles were placed at the end of the cavity to minimize microwave reflection. The experimental setup consists of a 2 kW magnetron (1.7 kW at the waveguide exit measured by power meter [HP 437B]), circulator and dummy load for magnetron protection, diodes for forward and reflected power measurement, and WR-284 waveguide to direct the field within the cavity.

The field distribution was simulated using Consul Multiphysics, modeling both antenna and FR4 dielectric substrate. The simulated field strength at the dipole feed is 15.7 to 22.1 kV/m (27.1 kV/m in absence of the igniter PCB device). A phantom color camera (V9.0) was used to record the ignition event by viewing inside the freespace cavity through a faraday grading. A DG535 signal generator was used to trigger the camera and the magnetron. Ignition delay was defined as the time delay between switching on the magnetron's power supply and the observation of first light from the high-speed video record. Multiple experiments were performed (5 times at each data set), in which average ignition delay and standard deviations reported unless specified otherwise. In order to account for the unsteady power during the magnetron rise period, the power transient was measured at the waveguide exit plane. The power history was found to be highly repeatable, so ignition energy was calculated using numerical integration of this power history measurement. The 90% rise time of the freespace cavity was measured to be 73 ms, and power after this rise was assumed to be a steady 1700 W.

Results

Figure 7A:
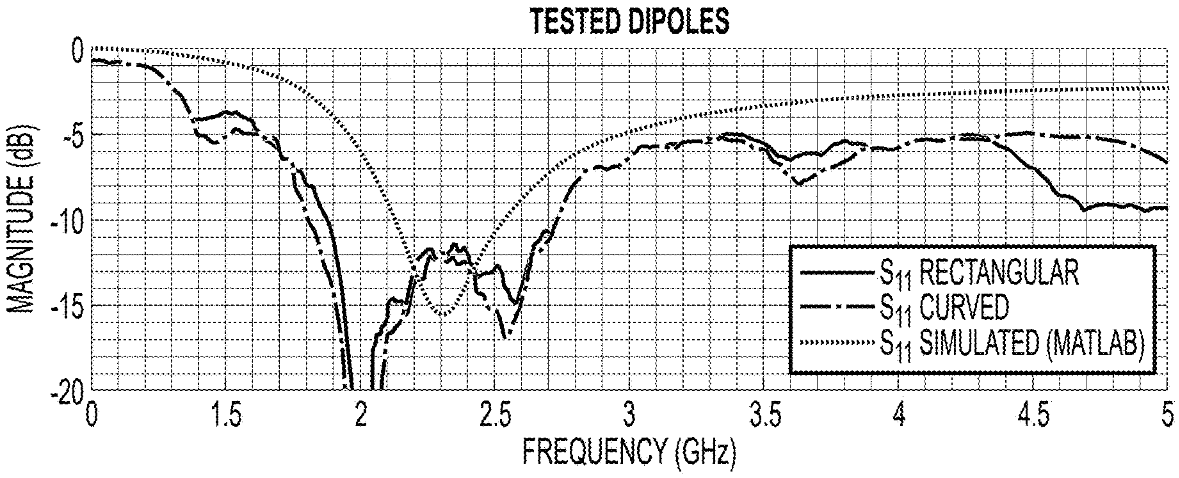
FIGS. 7A-C show measured dipole frequency responses.

Frequency response measurements shown in FIG. 7A indicate dipole resonance is at ~2.0 GHz as opposed to the designed resonance frequency of 2.45 GHz. Overall, the choice of either rectangular or curved dipole geometry has little effect on frequency response or loss amplitude as seen in FIG. 7A. Rectangular (dielectric igniter) and curved (bridgewire igniter) dipoles have S11 parameters of −13.3 dB (95.32% power absorption) and −14.42 dB (96.39% power absorption) respectively, at 2.45 GHz. They are compared with a dipole response simulated by the MATLAB Antenna Toolbox, The MATLAB Antenna Toolbox utilizes a full EM solver using the method of moments.

Figure 7B:
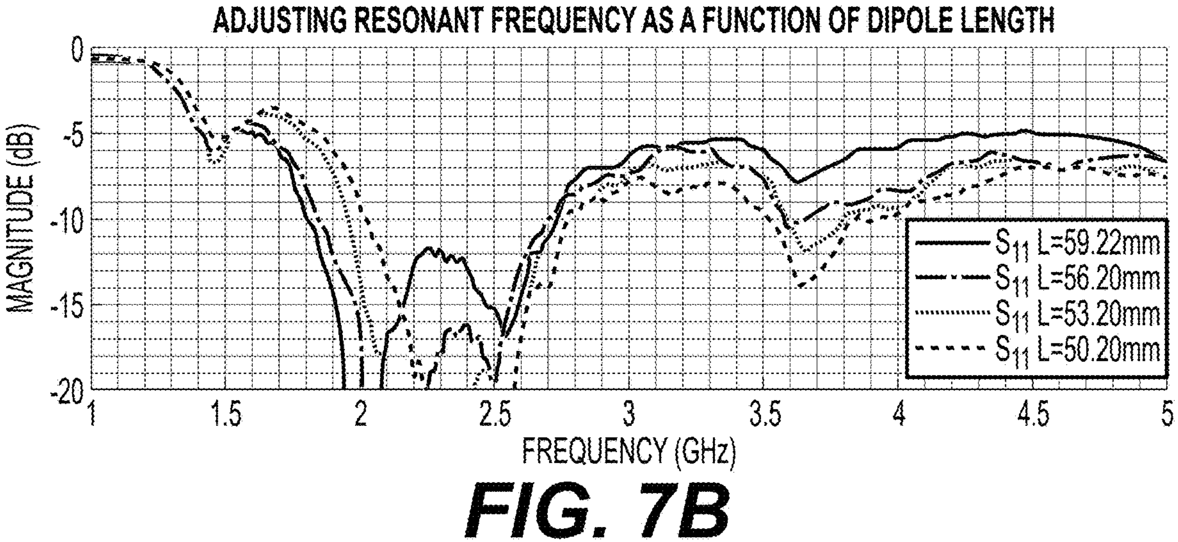

Adjustment of dipole resonant frequency can be accomplished through varying dipole length (FIG. 7B). Reducing dipole length from 29.11 mm to 24.6 mm increases measured resonant frequency from ~2.00 GHz to ~2.25 GHz. The width of the dipoles can also play a role in the control of the resonant frequency and the bandwidth of the antenna.

Figure 7C:
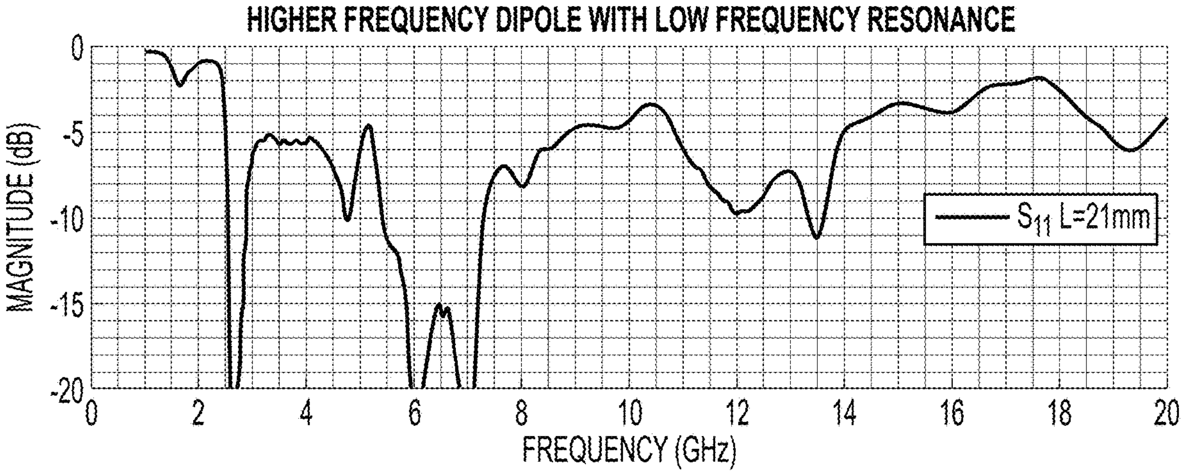

FIG. 7C shows that a much shorter dipole length (e.g. 21.0 mm half wavelength) also produces multiple narrower bandwidth S11 losses below the theoretical half wavelength resonance of this dipole (7.49 GHz, calculated).

Figure 8A:
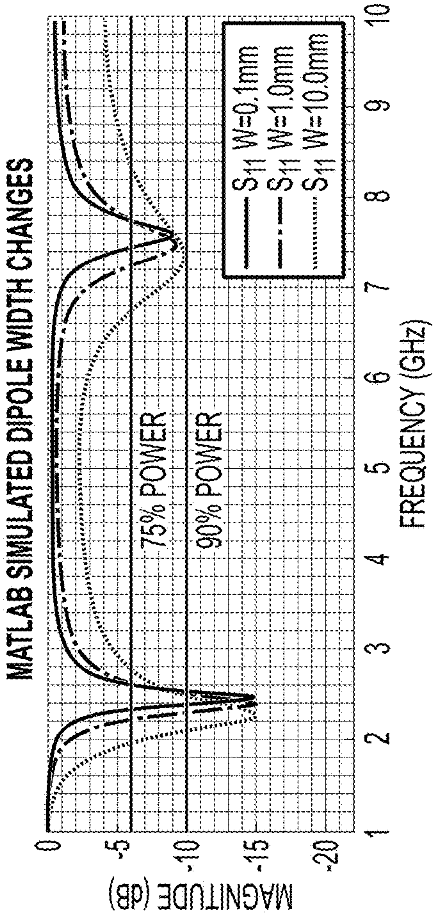
FIGS. 8A-D shows MATLAB simulation of dipoles with various widths and lengths.
Figure 8B:
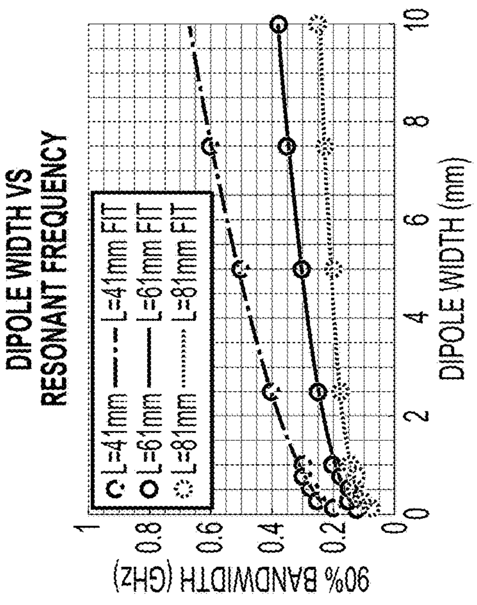
Figure 8C:
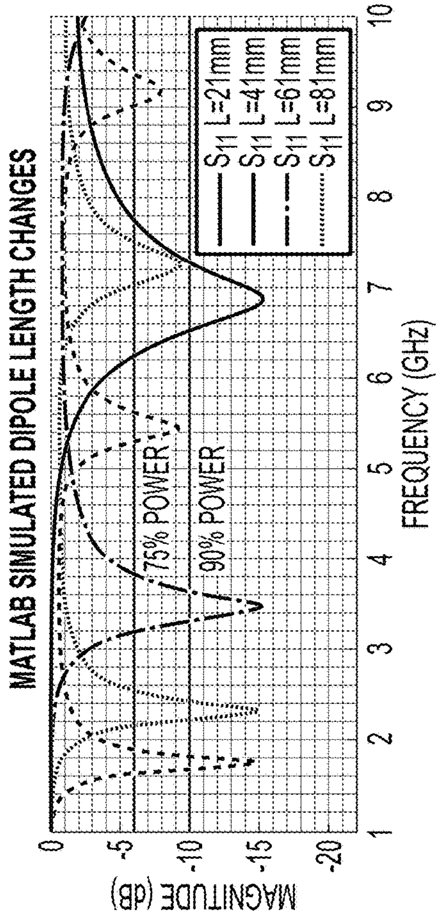
Figure 8D:
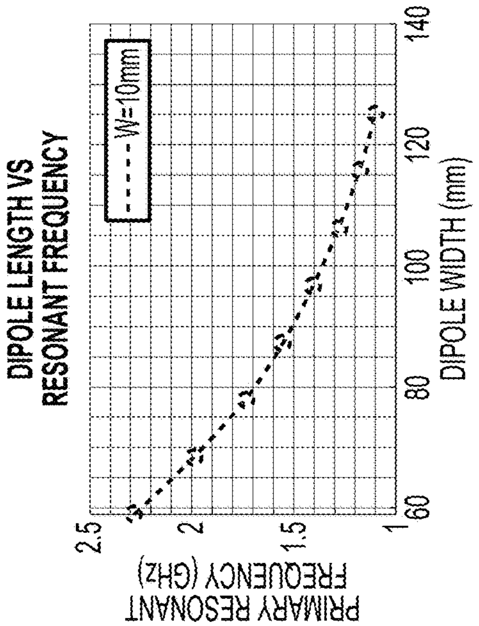

A greater understanding of the tunability of dipole frequency response can be observed through systematic variation of both dipole length and width using the MATLAB antenna toolbox. FIG. 8A shows that decreasing the width of a dipole primarily decreases bandwidth, with little effect on center frequency. From a practical perspective, in this experiment, a frequency response of −10 dB (90% power absorption) is a necessary loss to achieve microwave ignition and use this metric to compute bandwidths described herein. FIG. 8B demonstrates the relationship between dipole length, width and the 90% power bandwidth. The relationship between 90% power loss bandwidth and dipole width can be described over frequencies ranging from L-band to X-band (FIG. 8B) as the expression (3), fitted by the curve fitting toolbox of MATLAB. In this expression, w and l are dipole width and half wavelength dipole length (mm, mm), respectively. Inspection of the coefficients of (3) indicates the dipole width most strongly affects bandwidth, though dipole length is also important and must be considered. These results show that varying the bandwidth and length of a dipole can change the bandwidth as much as 0.4 GHz. FIG. 8C shows the effect of the dipole length on the center frequency. This is further explored in FIG. 8D, which shows the length dependence of resonant frequency, which is described by the power law relationship.

Figure 9A:
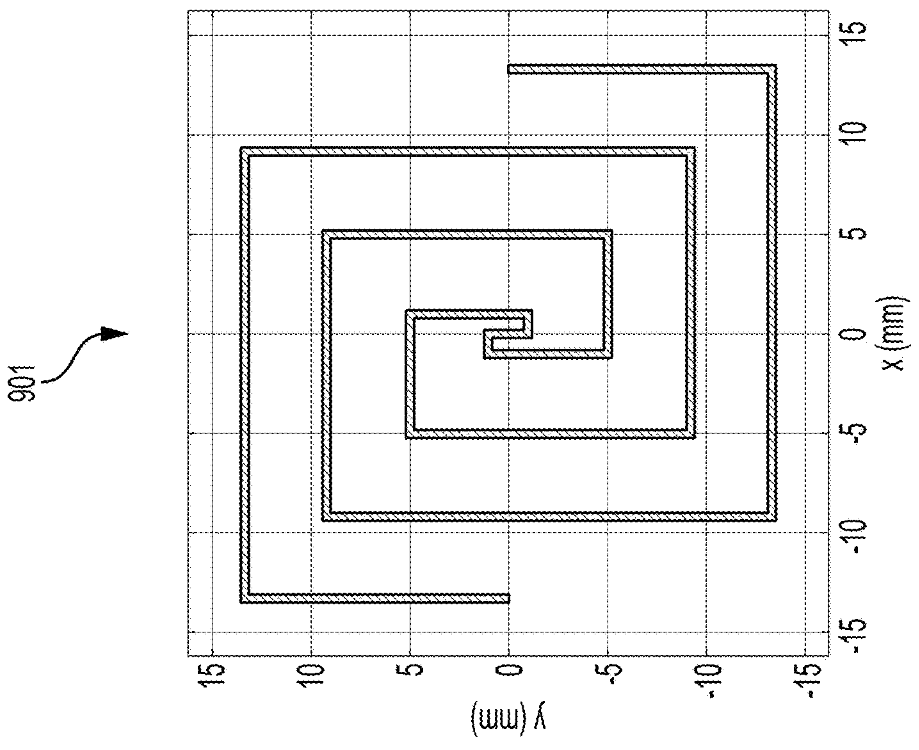
FIG. 9 shows schematic of miniaturized, narrow bandwidth, high frequency response rectangular spiral dipole antenna.
Figure 9B:
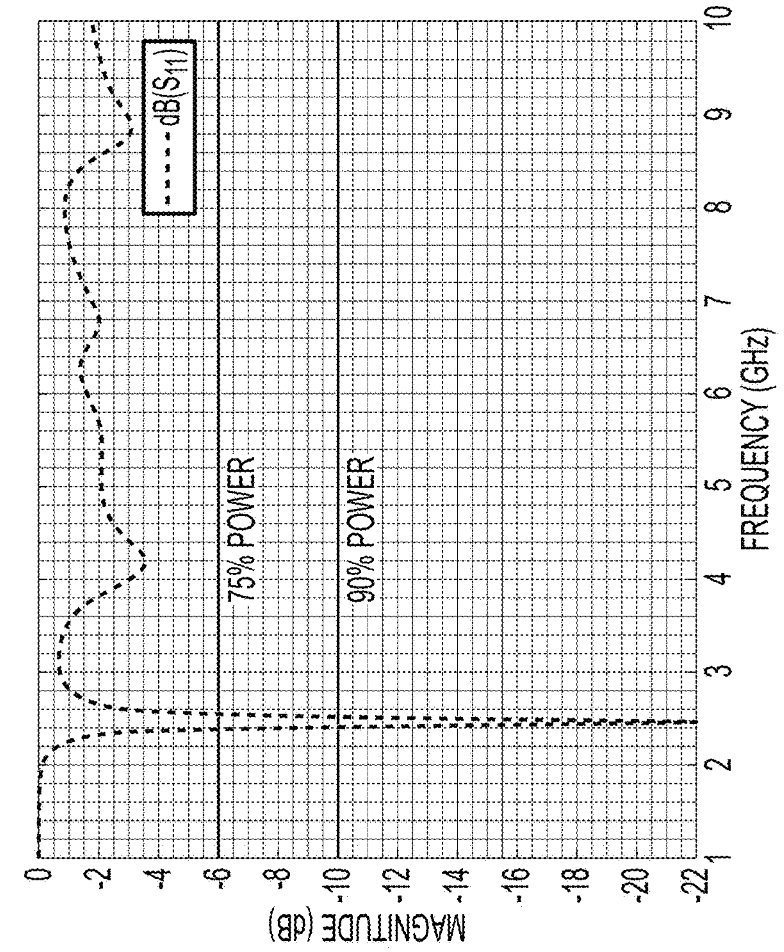

While straight dipole antenna geometries are simple and easily created, their greater bandwidth and physical footprint, when compared to other antenna designs, can be unsatisfactory. FIG. 9 demonstrates an antenna geometry and resulting frequency response of a rectangular spiral antenna 901 that resonates at 2.45 GHz. Compared to the dipoles discussed above, the bandwidth for the rectangular spiral antenna is much lower. In addition to greater frequency selectivity, the antenna also occupies an area smaller than a 15 mm×15 mm square (compared dipoles antennas of dimensions ~60 mm by 10 mm), allowing for antenna miniaturization. Rectangular spiral antennas can be considered where manufacturing complexity is not of concern and space constraints and high frequency selectivity are desired.

Ignition Delay: Dielectric Breakdown Mode

Figure 10A:
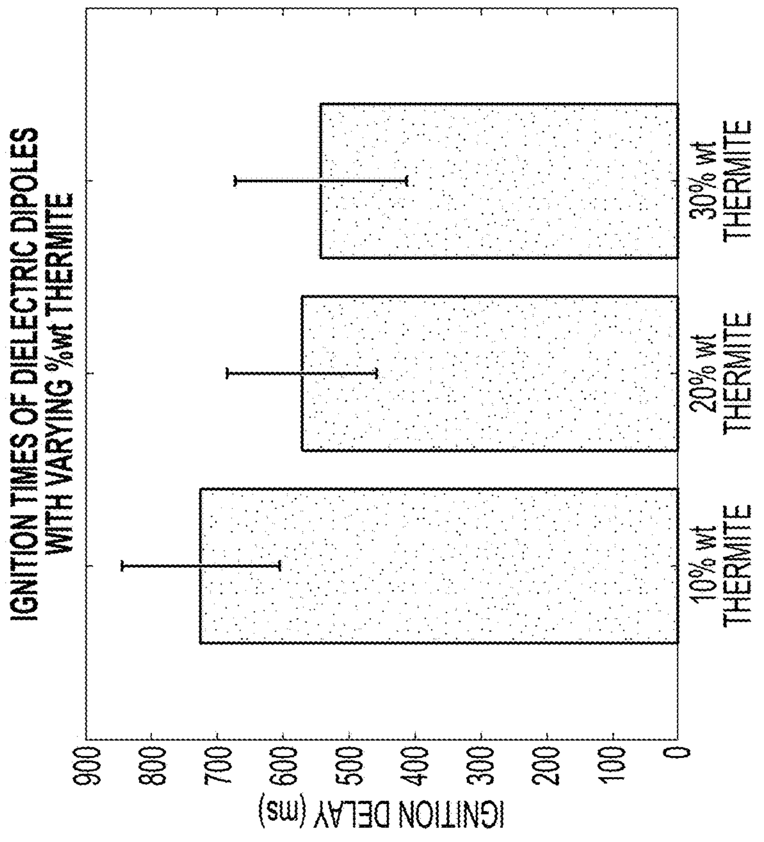
FIG. 10 shows measured ignition delay for dielectric igniters as a function of nanoscale thermite wt. % loading in epoxy-based dielectric composition.
Figure 10B:
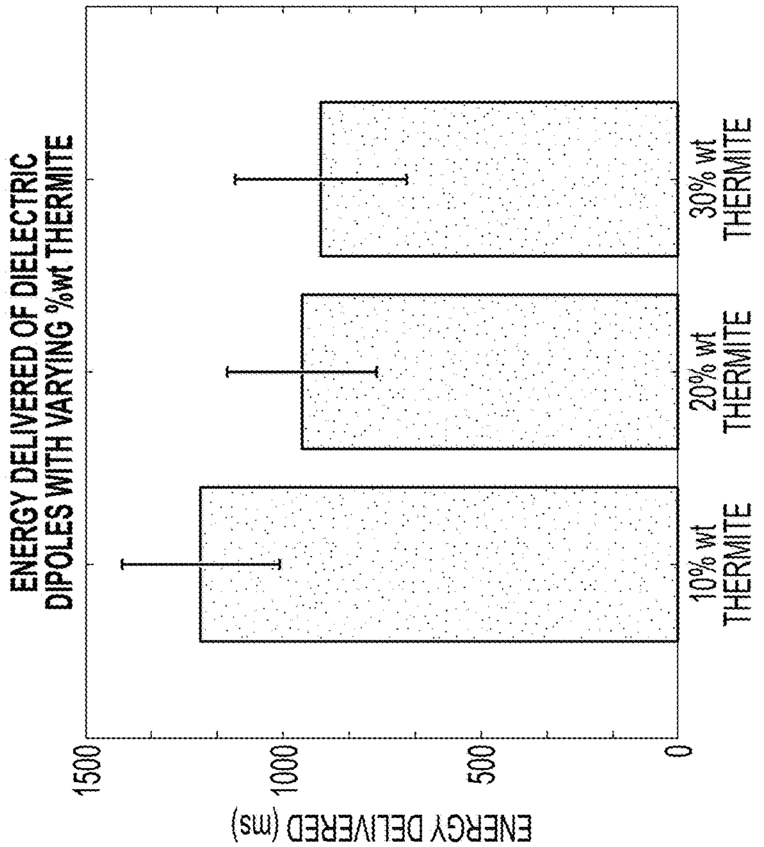

The results of ignition delay experiments are presented in FIG. 10. In increasing the quantity of $Al/Bi_2O_3$ thermite in the dielectric epoxy from 10 wt. % to 20 wt. %, a reduction in ignition delay time from ~720 ms to ~580 ms is observed. Further increase in thermite loading within the dielectric (30 wt. %), however, results in only minor subsequent reduction in ignition delay. Energy delivered to the dipole for these three thermite loadings during the ignition induction period ranges from ~1000 J to ~1500 J.

As can be appreciated, the ignition delays of dielectric igniters, on the order of hundreds of ms, are rather long. The long ignition delays can be explained by the AC dielectric breakdown mechanism hypothesized to lead to igniter function. The quarter wavelength microstrips at or near resonant frequency result in maximum voltage potential across the dielectric gap for a short period of time during a single microwave period. Dielectric breakdown times are on the order of nanoseconds, and as such, complete breakdown cannot be achieved in a single microwave period (0.4 ns). The breakdown process, thus, is best explained by partial discharge theory, in which creation and accelerated growth of a partial breakdown path occurs, effectively reducing the dielectric strength via damage created in a progressive manner over many microwave cycles until dielectric strength is sufficiently weakened enough that catastrophic breakdown can occur.

Ignition Delay: Bridgewire Dipole Mode

It is possible to obtain reliable and repeatable ignitions in a variety of different wire materials, as shown in Table 1. A number of differences can be observed in ignition events. For example, in image sequences of the ignition of copper, tantalum, tungsten, and molybdenum wires, some ignition events occur accompanied by a significant amount of combustion product smoke. Notably, for all of these wire materials except copper, the oxide melting temperature is lower than the bulk metal melting temperature. Conversely, little smoke is observed from NiCr 60 (nickel chromium 60) and stainless wires, which produce only metal plasmas in the early stage of ignition. Some jetting of hot, burning metal particles can also be observed in the ignition sequence of tantalum wire.

Given the distinct differences in observed ignition behavior, the mechanism responsible for ignition is material specific, though regardless of material, resembles to an extent, the early stages of exploding bridge-wire (EBW) function in response to a single, high voltage current impulse. Heating in the bridgewire dipoles occurs due to the joule heating from high current density at the wire cross-section. When the igniter is placed in a microwave field, the dipoles' potentials on either side of the wire oscillate with the field frequency. Due to the skin depth effect, current density within the wire is non-uniform and is localized to the skin depth region at the extent of the wire's diameter, where is frequency (Hz), is permittivity of free space (H/m), and is conductivity (S/m). Bulk heating of the wire's core then occurs from radial thermal conduction within the wire. Upon significant joule heating of the wire, the subsequent mechanism leading to an ignition event varies based on wire material. For most wires, during microwave joule heating, the wire heats to its melting point and undergoes phase transformation. During this process, heating rate is controlled by bridgewire sensible enthalpy and electrical resistivity (conductivity), and as such, is temperature-variant due to the temperature dependencies of wire material electrical resistivity and specific heat. Due to these temperature dependencies, the heating rate of most metal wire materials typically accelerates with increasing temperature. The entire function of an EBW occurs on the timescale of a few microseconds, which is much faster than the timescales of the liquid metal wire necking due to gravity and surface tension forces. However, for microwave antenna igniters, as the ignition timescale is three or more orders of magnitude slower, surface tension and gravity forces are expected to be significant. As such, necking of the liquid metal wire can occur due to these forces, which leads to further current density increase and more rapid heating at the necked wire region. Eventually, either 1) the liquid wire necks to separation, producing a minimum-distance dielectric gap spark plasma, or 2) the liquid wire continues to heat, eventually leading to wire metal combustion or wire metal volatilization and subsequent vapor phase metal combustion.

Once a spark plasma or metal combustion flame is established, subsequent, long duration emission is expected to be possible with continued microwave irradiation for up to ~100 ms. This long-duration event, despite the high heat transfer losses of the wire, is a result of a continuously microwave supported plasma, which can be due to 1) dipole current conduction through the high conductivity plasma present at the wire gap and/or 2) direct microwave energy deposition to the plasma and/or metal combustion flame (i.e. not through the dipole antenna) via the microwave-flame coupling modes of metal/metalloid atom electron seeding and/or metal oxide dielectric loss thermal runaway.

Figure 11A:
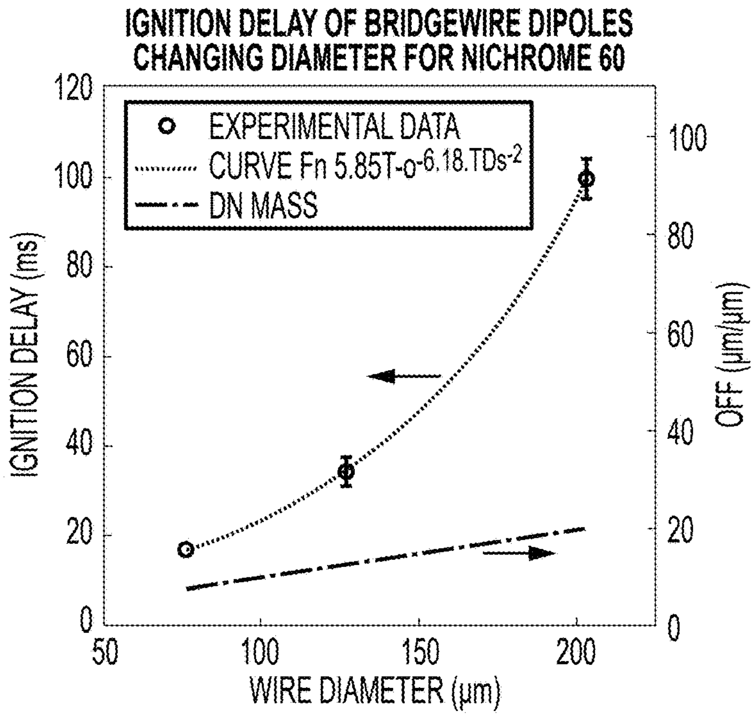
FIG. 11A shows ignition delay for three sizes of Nichrome 60 wire igniters with an exponential curve fit.
Figure 11B:
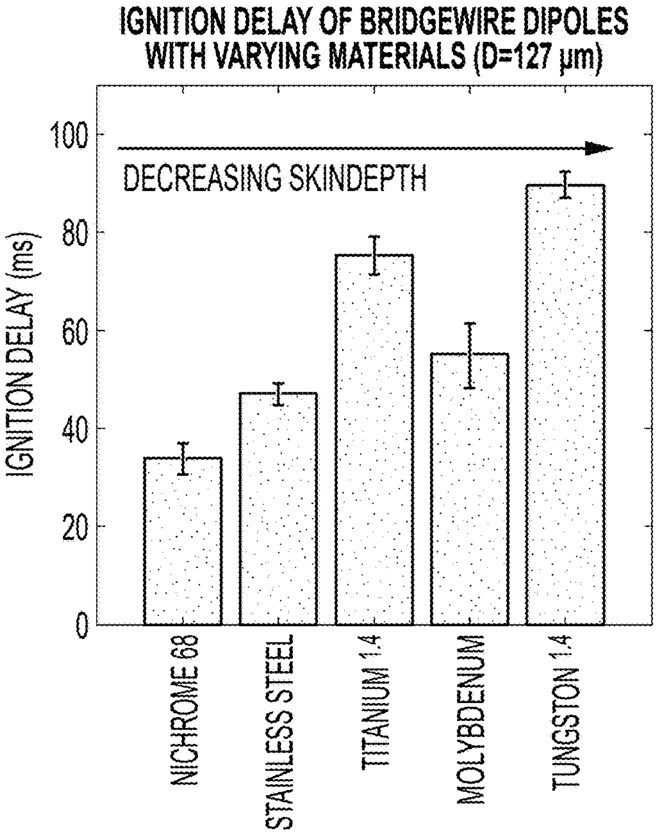
FIG. 11B shows ignition delay for various materials at the same diameter, listed in order of decreasing skin depth.
Figure 11C:
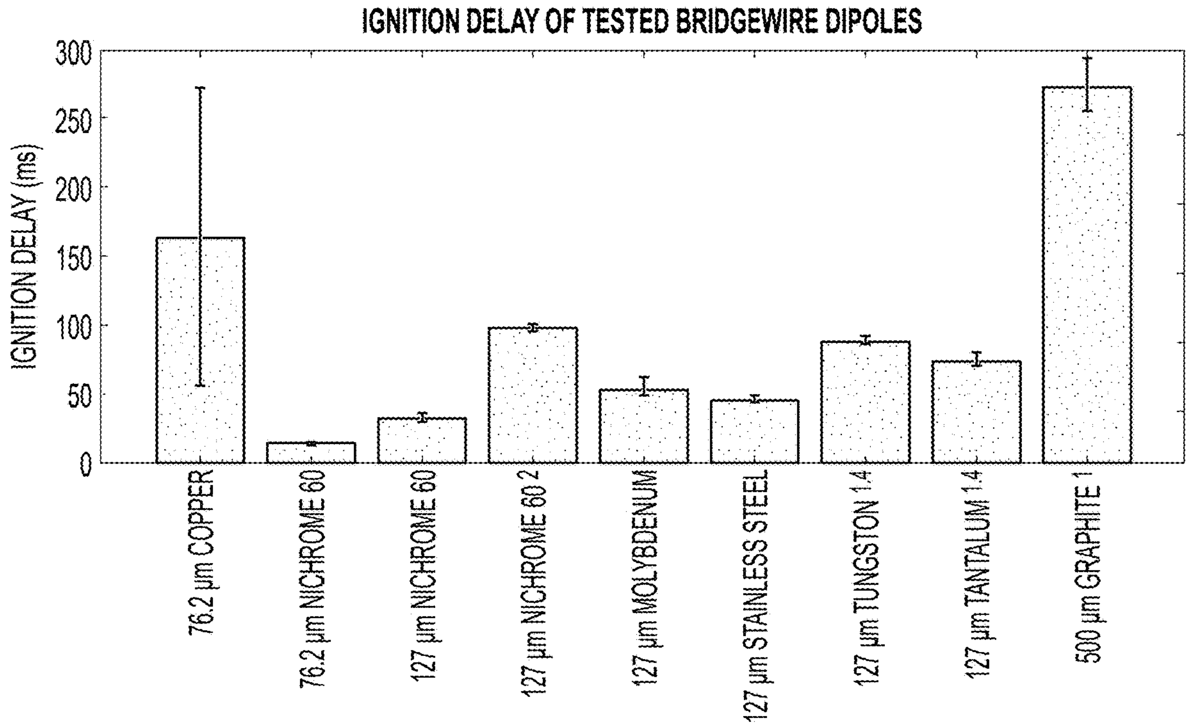
FIG. 11C shows ignition for all bridgewire materials tested.
Figure 11D:
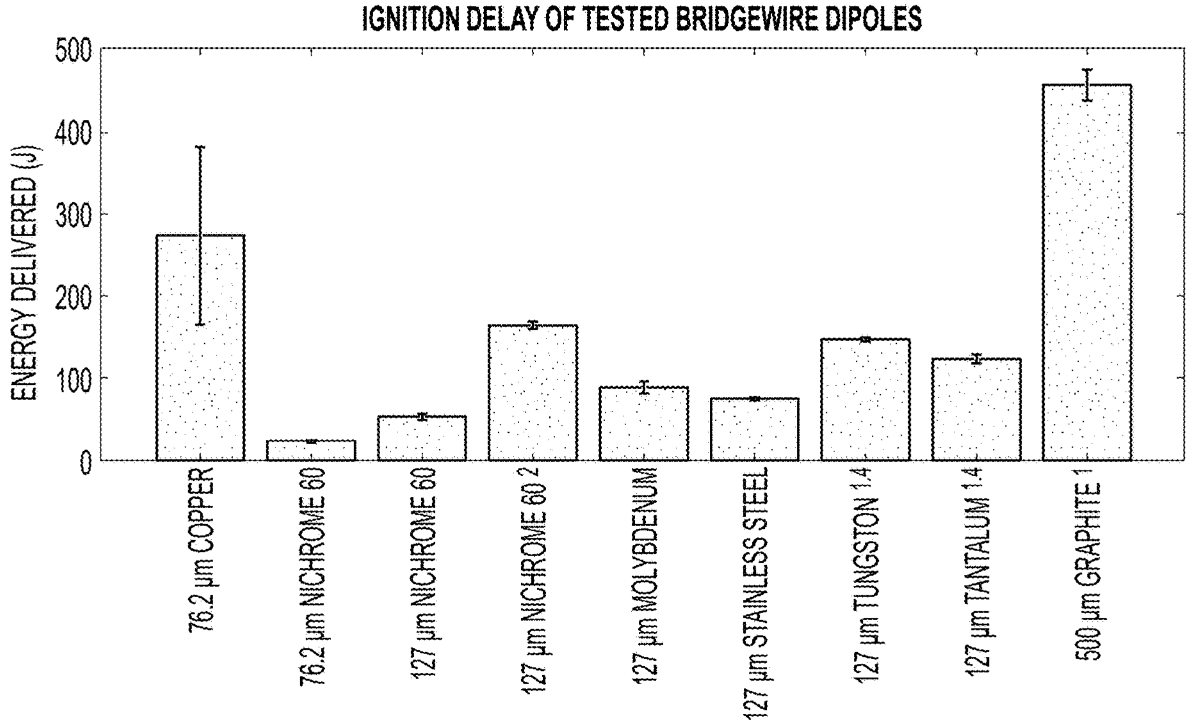
FIG. 11D shows energy delivered for ignition of the dipole by numerically integrating the power history of the free space cavity.
Figure 12:
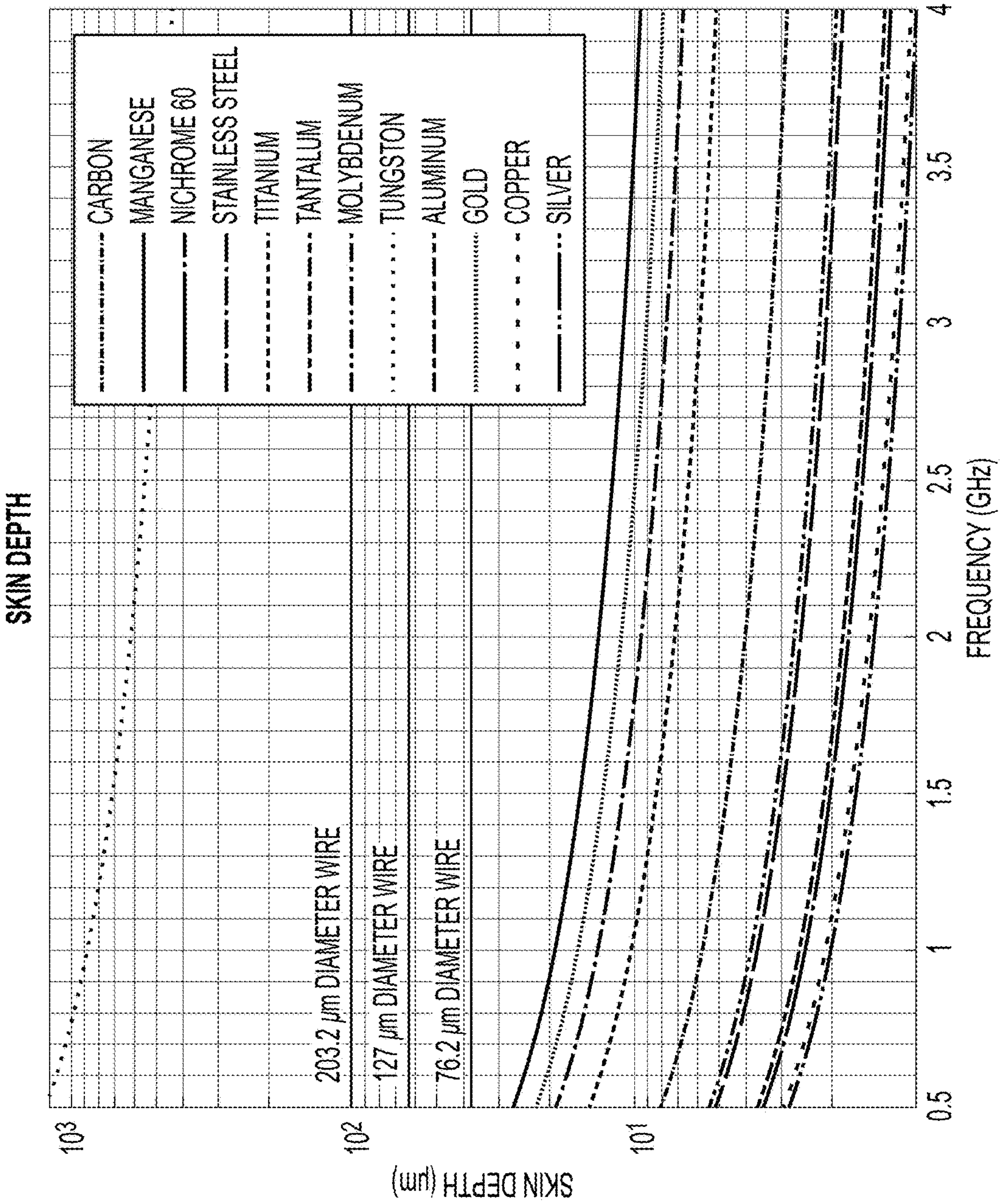
FIG. 12 shows skin depth as a function of frequency and wire material.

Measured bridgewire ignition delays are reported in FIG. 11A-D. FIG. 11A shows ignition delay of a nichrome 60 wire as a function of wire diameter. An exponential curve fit is shown to describe the diameter dependence of ignition delay. This form was determined to follow $$t_{ign} = \frac{2\rho\sigma C_v}{J_s^2 \mathrm{Re}\left(e^{-2D(1+j)/\delta}\right)}(T_{ign} - T_i)$$

where Js is the current density at the surface of the wire. This expression is derived from a wire energy balance and describes sensible (non-latent) joule heating of a wire in an axially aligned AC field in absence of heat transfer losses. An exponential current distribution within the wire skin thickness, δ, is assumed. Ignition delays are shown in FIG. 11C as a function of skin depth for wires of various materials of 127 μm diameter. FIG. 12 shows the calculated skin depths of various wire materials over S-band frequencies. The times required to establish bridgewire ignition range from 17 ms to 271 ms.

Energy required for ignition ranges from ~24.4 to ~457.1 J (the energy required to sustain the electro-magnetic field prior to first light). These measures of ignition energy are the amount of energy leaving the exit plane of the waveguide prior to observation of ignition first light. While not substantial, they are still several orders of magnitude higher than the ideal (i.e. no heat loss) amount of sensible and latent energy required to melt the wires investigated in this study, which ranges from 25 mJ to 250 mJ. The most significant difference between these two energy quantities is likely due to an abundance of the field not interacting with the dipole antenna and conductive heating of the solder pads. Convective and radiative losses are expected to be minor due to the short timescales of the wire heating event. FIG. 11C presents ignition delay data of all wires (materials and diameters) tested. Of note is the addition of copper and graphite rods. Copper's poor performance is attributed to its small skin depth (a result of the high electrical conductivity of copper), which leads to a slow heating rate. Grapite's poor performance is attributed to its unique ignition mechanism (volatilization rather than melting).

In order to explore the bandwidth selectivity of igniters, a 21 mm half wavelength dipole (S-parameters reported in FIG. 4*c*) that had a low power absorption at 2.45 GHz (S11=−2.3 dB) was tested. This particular dipole geometry has a resonant frequency centered at 2.71 GHz (0.17 GHz BW), which is near the microwave source frequency but outside the resonant bandwidth. Nichrome 60 wire with a 76.2 μm diameter was selected due to its consistent and short ignition delay. Out of five trials, zero igniters achieved an ignition event within 5 seconds, although they did have interaction (electrical arcing) with metallic lettering on the FR4 board (used in the fabrication process to track boards). Compared to the fast and repeatable ignition delay results for 76.2 μm nichrome 60 bridgewire igniters on 10 mm dipole antennas (17.06±0.65 ms, FIG. 11A-D), one can conclude that the rejection of off-frequency high-power fields that may produce accidental ignitions is good. As such, dipole antennas of various different frequency responses may be able to be incorporated into devices in order to achieve frequency-selectable ignition modes or to prevent accidental ignition.

Although the invention has been described in detail with reference to certain preferred embodiments, variations and modifications exist within the spirit and scope of the invention as described and defined in the following claims.

The invention claimed is:

1. A tunable microwave-initiated antenna igniter comprising:

a pair of tunable microstrip antennas configured to receive an electromagnetic radiation frequency that provides ignition energy; and a conductive material spanning a gap between said pair of tunable microstrip antennas.

2. The device of claim 1, wherein said pair of tunable microstrip antennas are disposed on a substrate.

3. The device of claim 2, wherein said substrate is a printed circuit board.

4. The device of claim 2, wherein said substrate is an FR4 printed circuit board.

5. The device of claim 1, wherein said pair of tunable microstrip antennas comprises half wavelength aluminum microstrip dipole antennas.

6. The device of claim 1, wherein said half wavelength aluminum microstrip dipole antennas are rounded microstrip dipole antennas.

7. The device of claim 1, wherein said half wavelength aluminum microstrip dipole antennas are rectangular microstrip dipole antennas.

8. The device of claim 1, wherein said pair of tunable microstrip antennas are tunable for frequency and bandwidth.

9. The device of claim 1, wherein dipole resonant frequency of said pair of tunable microstrip antennas is tuned by varying dipole length.

10. The device of claim 1, wherein dipole resonant frequency and bandwidth of said pair of tunable microstrip antennas is tuned by varying dipole width.

11. The device of claim 1, wherein said pair of tunable microstrip antennas are tunable to reject off-frequency high-power fields that may produce accidental ignitions.

12. The device of claim 1, wherein said gap is a dielectric gap.

13. The device of claim 1, wherein said conductive material spanning said gap is a bead of thermite epoxy.

14. The device of claim 13, wherein said thermite epoxy comprises dielectric epoxy and nanothermite.

15. The device of claim 13, wherein said thermite epoxy comprises 70 wt. % to 90 wt. % dielectric epoxy and 10 wt. % to 30 wt. % nanothermite.

16. The device of claim 1, wherein said conductive material spanning said gap is a bridgewire.

17. The device of claim 16, wherein said bridgewire is selected from the group consisting of 304 stainless steel, copper, molybdenum, nickel chromium 60, tantalum, and tungsten.

18. The device of claim 16, wherein said bridgewire spans said gap by soldering.

19. The device of claim 16, wherein said bridgewire is copper plated prior to soldering.

20. The device of claim 16, wherein said bridgewire spans said gap by joining using conductive epoxy.

21. The device of claim 1, wherein said bridgewire spanning said gap is graphite.

22. A tunable microwave-initiated antenna igniter comprising:

a pair of tunable microstrip antennas disposed on a substrate and configured to receive an electromagnetic radiation frequency that provides ignition energy; and a conductive material spanning a dielectric gap between said pair of tunable microstrip antennas;

wherein tuning a dipole length and/or width of said tunable microstrip antennas tunes a dipole resonant frequency and/or bandwidth to reject off-frequency high-power fields to prevent accidental ignitions.

23. The device of claim 22, wherein said substrate is a printed circuit board.

24. The device of claim 22, wherein said substrate is an FR4 printed circuit board.

25. The device of claim 22, wherein said pair of tunable microstrip antennas comprises half wavelength aluminum microstrip dipole antennas.

26. The device of claim 22, wherein said half wavelength aluminum microstrip dipole antennas are rounded microstrip dipole antennas.

27. The device of claim 22, wherein said half wavelength aluminum microstrip dipole antennas are rectangular microstrip dipole antennas.

28. The device of claim 22, wherein said conductive material spanning said gap is a bead of thermite epoxy.

29. The device of claim 28, wherein said thermite epoxy comprises dielectric epoxy and nanothermite.

30. The device of claim 28, wherein said thermite epoxy comprises 70 wt. % to 90 wt. % dielectric epoxy and 10 wt. % to 30 wt. % nanothermite.

31. The device of claim 22, wherein said conductive material spanning said gap is a bridgewire.

32. The device of claim 31, wherein said bridgewire is selected from the group consisting of 304 stainless steel, copper, molybdenum, nickel chromium 60, tantalum, and tungsten.

33. The device of claim 31, wherein said bridgewire spans said gap by soldering.

34. The device of claim 31, wherein said bridgewire is copper plated prior to soldering.

35. The device of claim 31, wherein said bridgewire spans said gap by joining using conductive epoxy.

36. The device of claim 22, wherein said bridgewire spanning said gap is graphite.

* * * * *